T. J. & G. F. LEWIS.
PLANTING MACHINE.

No. 1,657. Patented June 27, 1840.

UNITED STATES PATENT OFFICE.

THOS. J. LEWIS AND GEO. F. LEWIS, OF BOSTON, MASSACHUSETTS.

IMPROVEMENT IN SEED-PLANTERS.

Specification forming part of Letters Patent No. 1,657, dated June 27, 1840.

*To all whom it may concern:*

Be it known that we, THOMAS J. LEWIS and GEORGE F. LEWIS, both of Boston, in the county of Suffolk and State of Massachusetts, send greeting: Be it known that we, the said THOMAS J. LEWIS and GEORGE F. LEWIS, have invented new and useful Improvements in Planting-Machines, which we denominate the "American Rotary Seed-Planter," to be used for planting the seed of the various productions indigenous to this country, of which the following is a specification.

These improvements, the principles thereof, the application of said principles by which the same may be distinguished from other inventions, together with such parts or combinations as we claim as our invention and hold to be original and new we have herein set forth and described, which description, taken in connection with the accompanying drawings, herein referred to, compose our specification.

Figure 1:
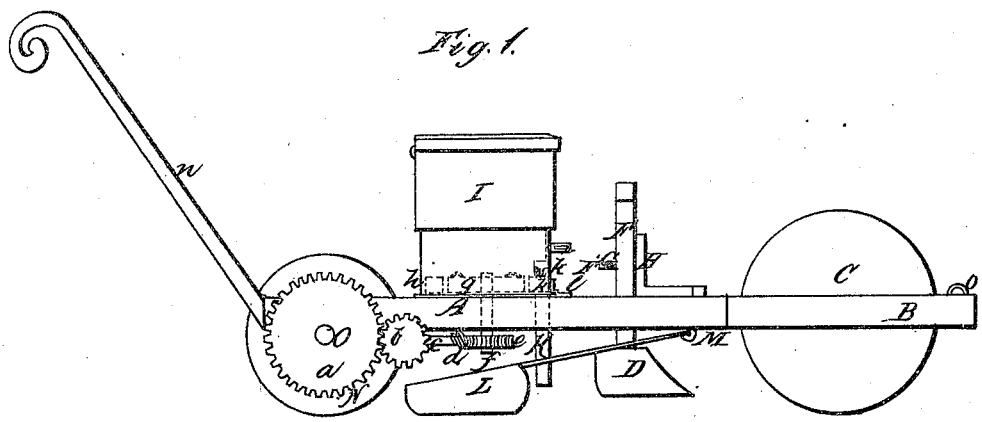
Figure 2:
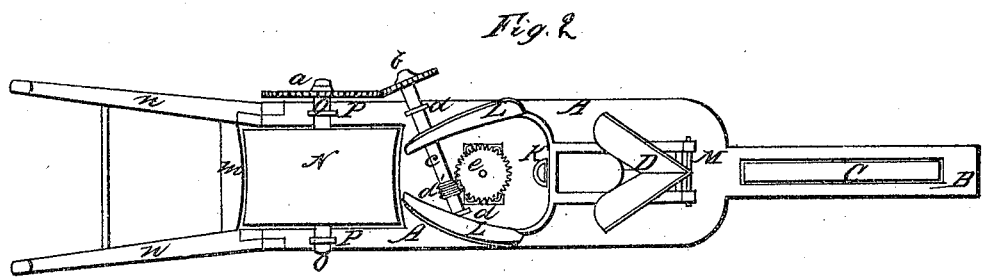

Figures 1 and 2 of the accompanying plate of drawings represent our improvements. Fig. 1 is an elevation of the same, Fig. 2 being a plan of the under side, showing the position and arrangement of the various parts.

A A is the body of the machine, to which the several parts are attached. In front of this body and making part of the same is the tongue B, in a slot in which is arranged in the usual way the guide-wheel or roller C. At a proper distance behind this roller is fixed the double plowshare D, which serves to open the furrow for the reception of the seed. This plowshare admits of adjustment to any depth of furrow by means of the upright arm F, attached to the top of the plowshare, which moves up and down in a slot of the body A A, and is clamped in any position by a pin, F′, (arranged with a slit and wedge, as shown at G,) projecting from the upright H, suitably attached to the body A A, and moving up and down in a slot in the arm F, the operation of which will be readily perceived.

I is the box or hopper in which the seed to be planted is placed, the upper part of said box being square and the lower part circular.

From the bottom of the hopper a pipe, K, communicates with the furrow and conducts the seed to the same, after which the furrow is closed by means of the scraping-frame L L, shaped and arranged as seen in the drawings, resting on the top of the sides of the plowshare D, and turning freely on a pivot or rod, M, so that by its own weight it adjusts itself to the different depths of the furrow, and likewise effectually closes the same. After the furrow is closed it is smoothed over by the roller N, the surface of which is sufficiently grooved to give the hill the proper shape. The axis O O of this roller turns in suitable bearings, P P, attached to the bottom of the body of the machine.

The proportioning or regulation of the distribution of the seed is effected by the following arrangement of machinery: On one end of the axis O O of the roller N is fixed so as to turn with the same the spur-gear wheel $a$, which works into and turns the spur-gear wheel $b$, firmly fixed on one end of the axis or cylinder $c\, c$, which rests and revolves in the supports or bearings $d\, d$. Near the other end of the axis $c\, c$ an endless screw, $d'$, is cut, which works into and turns the cogged wheel $e$, firmly and properly fixed on the upright shaft $f\, f$. This shaft passes up through the body A A of the machine, and is arranged with suitable shoulders so as to turn in said body. The top of this axis is square and fits into a square hole in the circular plate $g\, g$, which revolves with said axis. Round the edges or periphery of this revolving plate notches or space $h\, h$ are cut, which, coming in contact with the conducting-tube $h'$, before mentioned, cause the seed they contain to drop through the same into the furrow.

Any superfluous quantity of seed is prevented from passing through the conductor by a brush over the top of the same, arranged with a pin and wedge, as seen at $k$, with a slot in the side of the hopper, by this arrangement measuring out, as it were, the seed to the furrow. The bristles in the center of the brush are longer than those on the sides, serving (as will be seen) to force the seed through the conducting-pipe into the furrow.

It will readily be perceived that the machine may be adapted to different kinds of seed by removing the revolving plate $g\, g$ and substituting others varying in the number and size of the holes round the edges.

A hole is cut in the side of the hopper just above the conducting-pipe, so as to form, as it were, a box with three sides only, which allows the quantity of seed to expand before dropping, thereby preventing the same from clogging and greatly facilitating its passage to the furrow. The seed is prevented from wasting by slide *l* fitting loosely against the outside of the hopper.

A scraper, *m*, serves to prevent the soil from collecting on the smoothing-roller N.

The machine may be directed and moved by the plowman at the handles *n n*, or it may be worked by animal-power connected by a chain to the loop or staple *o*.

The parts of the above-described machine may be constructed of wood or metal, or both, at the discretion of the manufacturer.

Having thus described our improved apparatus, we shall claim in the same as our invention as follows:

The combination of the revolving circular plate, constructed and operated as above described, with the brush, conducting-pipe, and hole in the side of the hopper, as above set forth, for the purpose of measuring out and distributing the seed to the furrow, and also our arrangements by which we form a box or inclosure for the seed (when in apposition with the conducting-pipe) with three sides only, which greatly facilitates the dropping of the seed.

In testimony that the foregoing is a true description of our said invention and improvements we have hereto affixed our signatures this 25th day of July, in the year of our Lord 1839.

THOMAS J. LEWIS.
GEORGE F. LEWIS.

Witnesses:
EZRA LINCOLN, Jr.,
JOHN NOBLE.